Figure 1:
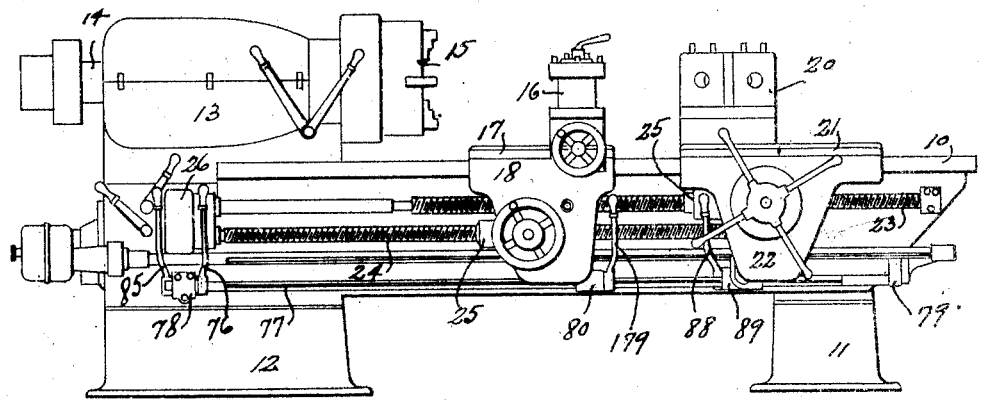

C. L. LIBBY.
GEARING.
APPLICATION FILED FEB. 6, 1908.

1,021,875.

Patented Apr. 2, 1912.
4 SHEETS—SHEET 1.

WITNESSES:
W. M. Gentle.
Olive Breeden

INVENTOR.
Charles L. Libby.
BY
V. H. Lockwood
ATTORNEY.

C. L. LIBBY.
GEARING.
APPLICATION FILED FEB. 6, 1908.

1,021,875.

Patented Apr. 2, 1912.
4 SHEETS—SHEET 2.

WITNESSES:
W. M. Gentle.
Olive Breeden

INVENTOR.
Charles L. Libby.
BY
V. H. Lockwood
ATTORNEY

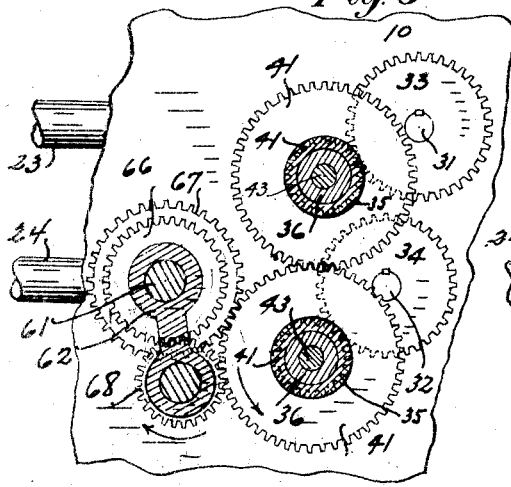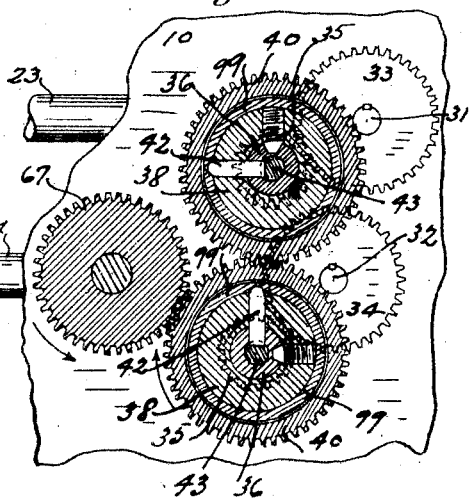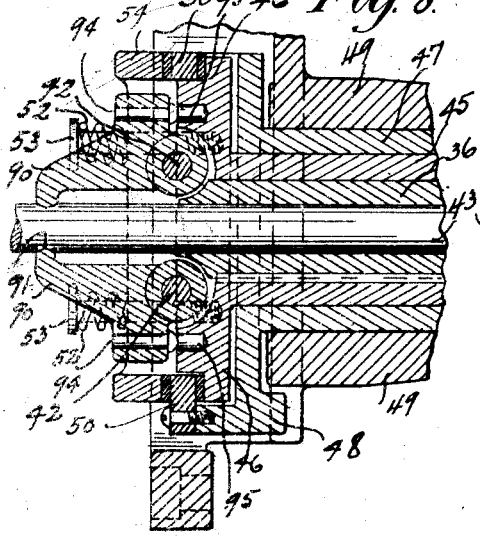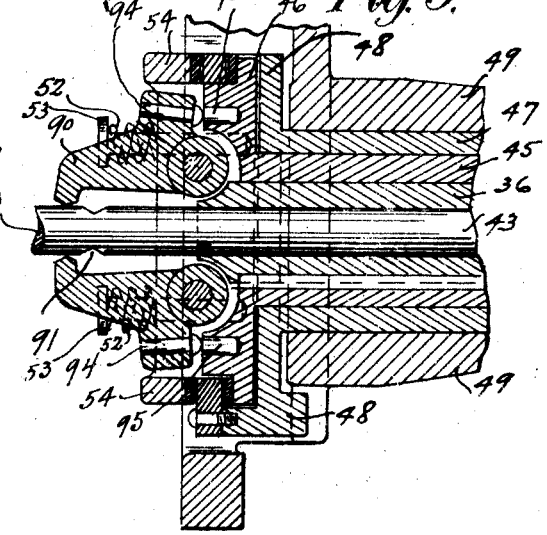

C. L. LIBBY.
GEARING.
APPLICATION FILED FEB. 6, 1908.

1,021,875.

Patented Apr. 2, 1912.
4 SHEETS—SHEET 4.

WITNESSES:
W. M. Gentle
Olive Breeden

INVENTOR.
Charles L. Libby.
BY
T. H. Lockwood
ATTORNEY.

UNITED STATES PATENT OFFICE.

CHARLES L. LIBBY, OF INDIANAPOLIS, INDIANA.

GEARING.

1,021,875.

Specification of Letters Patent. Patented Apr. 2, 1912.

Application filed February 6, 1908. Serial No. 414,504.

*To all whom it may concern:*

Be it known that I, CHARLES L. LIBBY, of Indianapolis, county of Marion, and State of Indiana, have invented a certain new and useful Gearing; and I do hereby declare that the following is a full, clear, and exact description thereof, reference being had to the accompanying drawings, in which like letters refer to like parts.

The object of this invention is to provide an improved quick traverse mechanism for carriages on lathes so that the operator by moving a lever can automatically move the carriage very rapidly, say thirty feet a minute and be thus relieved from moving the carriage along the lathe bed by hand as heretofore.

One feature of the invention consists in providing gearing whereby the quick traverse mechanisms of a plurality of carriages may be independently operated and controlled and at the same time be driven from one source of power. To that end I combine the clutch and brake mechanisms of the quick traverse mechanisms of the plurality of carriages and provide gearing whereby either or both quick traverse mechanisms may be thrown into or out of operation and moved in either direction or whereby they may be independently controlled.

Another feature of the invention consists in the novel clutch mechanism whereby the quick traverse may be readily stopped or operated in either direction. This, broadly stated, consists of a shaft with a friction cylinder thereon, a pinion loosely mounted on the shaft on each side of said friction cylinder, means for clutching either side of said cylinder with the corresponding pinion, and means, preferably within the shaft for controlling said clutching operation.

Another feature of the invention consists in combining with said clutch mechanism a simultaneously operable and controllable brake mechanism whereby when the quick traverse is thrown out of operation, it and the carriage will immediately cease movement, and the screw thereafter be held stationary. In this connection the brake mechanism is controlled by the same means that controls the clutch mechanism.

Figure 2:
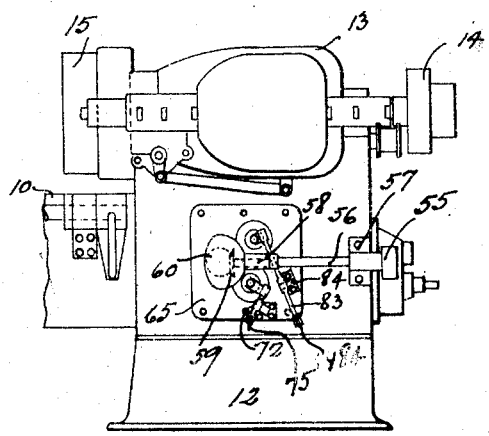
Figure 3:
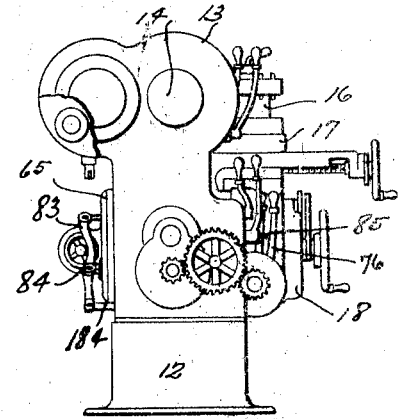
Figure 4:
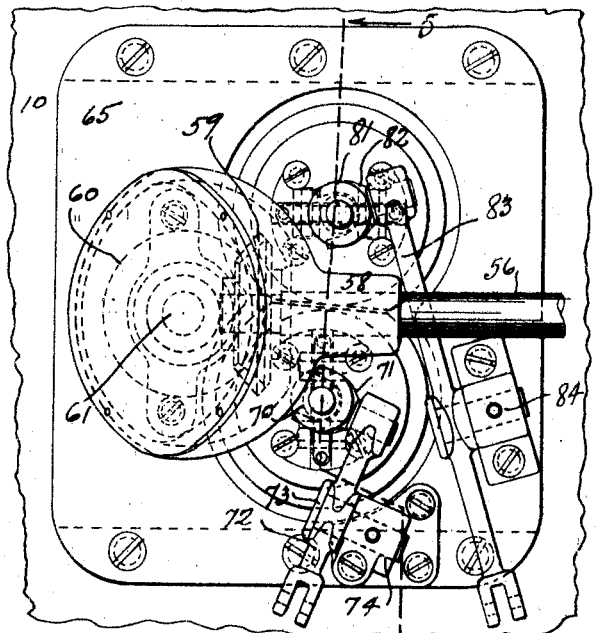
Figure 5:
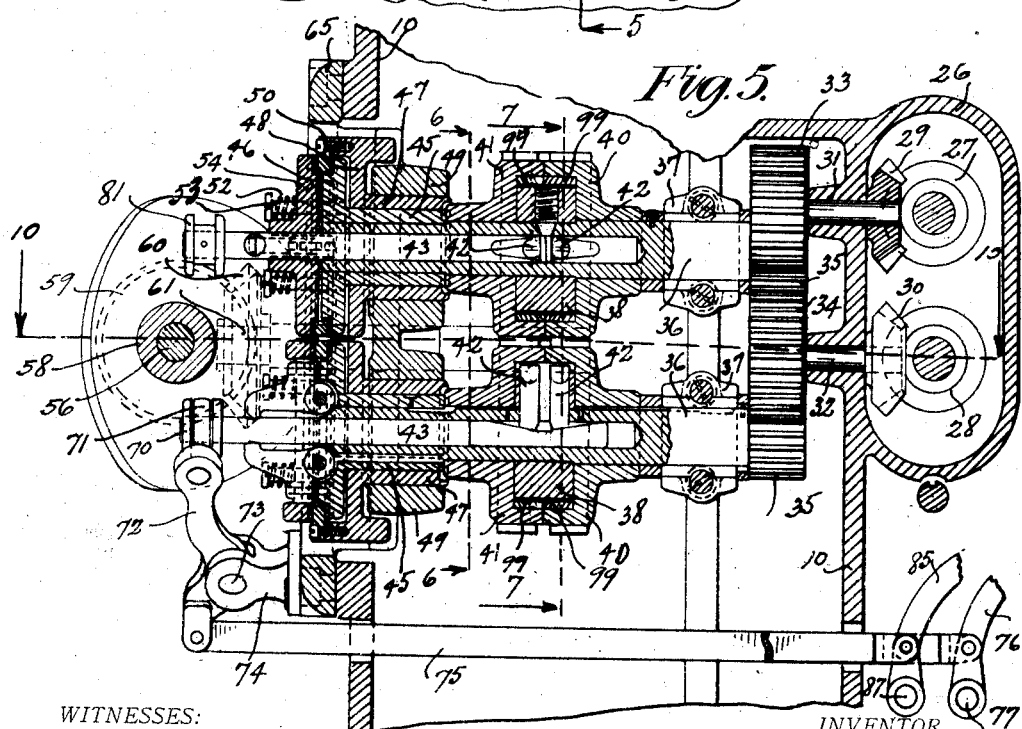
Figure 10:
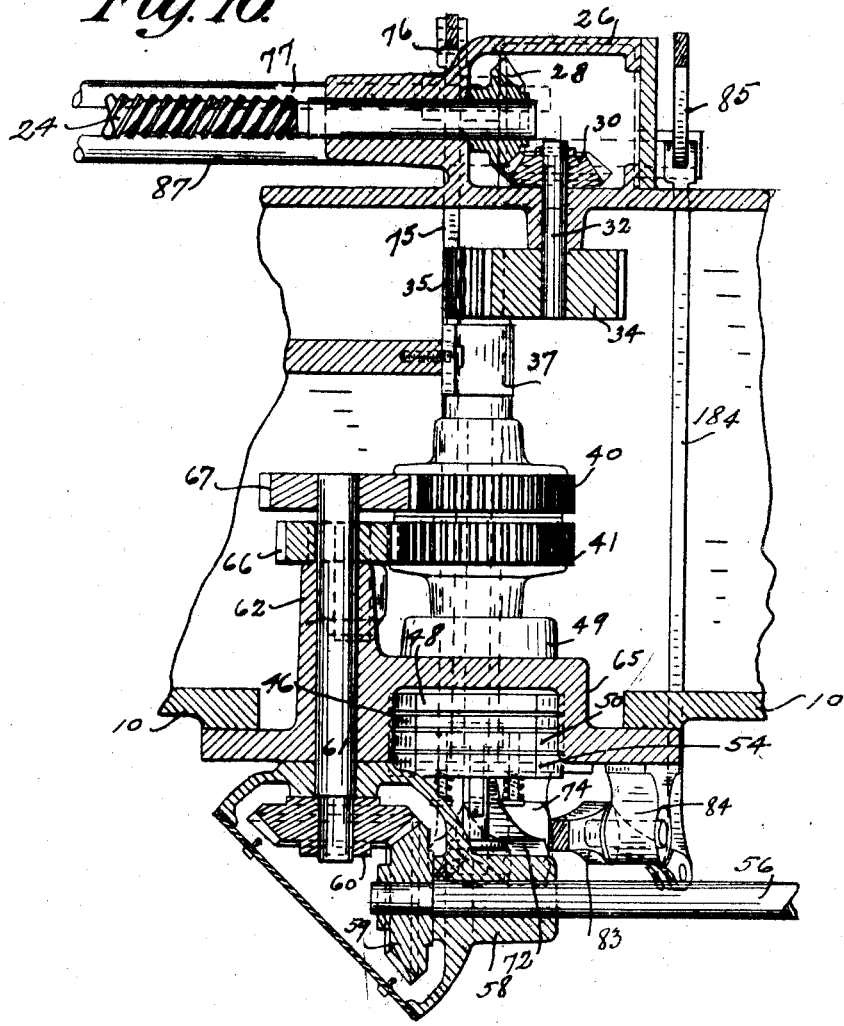

These and the other features of my invention will be understood from the accompanying drawings and the following description and claims:

In the drawings Figure 1 is a side elevation of a turret lathe. Fig. 2 is an elevation of the rear portion of what is shown in Fig. 1, a part being broken away. Fig. 3 is an elevation of the left hand end of Fig. 1, parts being broken away. Fig. 4 is an elevation of the quick traverse mechanism shown in Fig. 2, and on a larger scale. Fig. 5 is a transverse vertical section on the line 5—5 of Fig. 4. Fig. 6 is a vertical longitudinal section on the line 6—6 of Fig. 5, parts being broken away. Fig. 7 is a similar section on the line 7—7 of Fig. 5. Fig. 8 is a section of the lower brake mechanism shown in Fig. 5 on a larger scale and in the same position. Fig. 9 is the same as Fig. 8 in the releasing position of the brake. Fig. 10 is a horizontal section on the line 10—10 of Fig. 5.

In detail there is shown the bed 10 of a lathe on pedestals 11 and 12. On one end of the bed there is a casing 13 for the spindle 14. There is a chuck 15. There is a tool post 16 having a carriage 17 slidably mounted on the bed and from one side of which depends an apron 18. There is a turret 20 on the turret slide 21 slidable upon the bed 10 and having depending therefrom an apron 22.

The invention herein resides in the means for quick movement of the turret and tool post carriage upon the bed of the lathe. The turret slide for the turret 20 is moved and actuated by the upper quick traverse screw 23 that is mounted longitudinally of the machine beside the bed, and the tool post carriage is actuated by the lower quick traverse screw 24 similarly mounted. There is the usual connection, such as the nuts 25 between said quick traverse screws and the aprons 18 and 22 of the two carriages mentioned. The left hand ends of said screws 23 and 24, as shown in Fig. 1, are mounted in and project into a casing 26 and they carry bevel gears 27 and 28 which mesh with bevel gears 29 and 30 respectively on shafts 31 and 32 that carry the pinions 33 and 34, see Fig. 5.

The gear 33 on the upper spindle 31 meshes with the small pinion 35, see Figs. 5 and 7, it being mounted on the shaft 36 secured in bearings 37 at one end. On the shaft 36 about midway there is a friction hub 38 secured thereto and gears 40 and 41 beside said friction hub 38 and partially overlapping the same, as shown in Fig. 5 and which are alternately thrown into clutching engagement with the shaft 36 by radially movable pins 42, one for each gear, that are pushed outwardly into clutching engagement with said gears by a sliding rod 43 mounted centrally in the outer portion in the shaft 36, see lower part of Fig. 5, which is similar to the construction in the upper part of said figure. At the point where said rod 43 engages the two pins 42, said rod is concave so that when it is moved to the right as shown in Fig. 5 it will elevate the left hand pin and lower the right hand pin and when it is moved to the left it will elevate the right hand pin and lower the left hand pin, expanding friction ring 99 thus alternately locking or engaging the gears 40 and 41 with the friction hub 38. The lower gear 34 meshes with a pinion 35 corresponding with the pinion 35 above and on the lower shaft 36 which has a friction hub 38 and gears 40 and 41, the same as what is shown in the upper part of Fig. 5.

The outer ends of the two shafts 36 extend through sleeves 45 which project inwardly from the friction disks 46, said sleeves 45 having bearing in inwardly extending bearing sleeves 47. The friction disks 48 are stationary, the sleeves 47 being secured in the rings 49 which are integral with the frame or lathe bed. The friction rings 50 are secured by screws to the outer surfaces of the stationary disks 48 so as to overlap and to engage frictionally the disks 46, the latter being held in frictional engagement with said rings normally by springs 52 on the rods 53 that project through the outer friction disks 54 mounted on the shafts 36, whereby said springs 52 and rods 53 tend to clamp the two friction disks 46 and 54 in frictional engagement with the opposite sides of the stationary friction ring 48. The construction of the mechanism in connection with the lower shaft 36 as shown in Fig. 5 is the same as that in connection with the upper shaft in Fig. 5, but in that figure the lower parts have been turned one-fourth of a revolution farther than the upper parts.

Power from a suitable supply is brought to the pulley 55, on the driving shaft 56 and that is mounted in bearing brackets 57 and 58 on the rear side of the machine, as shown in Fig. 2. Said shaft carries a bevel gear 59, see Fig. 10, that meshes with a bevel gear 60 on the shaft 61 in the bearing 62, that is secured on the removable plate 65 fastened to the lathe bed 10 on the rear side. The shaft 61 on its inner end has secured to it two gears 66 and 67. The gear 66 through the pinion 68 see Fig. 6 drives the lower gear 41 and the gear 67 is in mesh and directly drives the lower gear 40, so that those two gears 40 and 41 are constantly driven but in opposite directions. Since the lower gears 40 and 41 are in constant mesh with the upper gears 40 and 41 they are both also constantly driven in reverse directions and power is transmitted from one or either of the gears 40 and 41 to the corresponding shaft 36 according to the position of the sliding rod 13, but when said rod is in the position shown in the lower part of Fig. 5 so that the clutch pins 42 are not in engagement with either of the gears 40 or 41, neither of the shafts 36 is driven. When said shafts 36 are not driven the quick traverse screws 23 and 24 are not rotated.

The means for controlling the clutch mechanism just described is as follows: The sliding rod 43 in the lower shaft 36 has on its outer end a pair of collars 70 between which an arm 71 is held that is secured in one end of the lever 72 which is fulcrumed between its ends by the pin 73 in the bracket 74, see Fig. 5. The lever 72 is actuated by the connecting bar 75 extending transversely through the bed 10 of the machine and which is reciprocated by the hand lever 76 on the end of the rod 77 that extends horizontally along one side of the machine, as shown in Fig. 1, being at one end mounted in bearing 78 and at the other end in bearing 79. In this manner the sliding rod 43 is moved into any one of three positions to control the clutch mechanism shown in Fig. 5. The function of the lever 76 at the left hand end of the machine is performed also by the hand lever 179 through which the rod 77 is splined and said rod 77 has bearing in sleeve 80 secured to the tool post carriage. The rod 77 can be actuated by either lever 76 or 179, as is most convenient.

The upper sliding rod 43 is actuated by a substantially similar mechanism as the lower one, there being on the end of said upper rod 43 a pair of collars 81 between which the arm 82 fits that is pivoted to the upper end of the lever 83 fulcrumed between its ends at 84 and actuated by a connecting bar 184 corresponding to bar 75 and actuated by a lever 85 corresponding to the lever 76, said lever being secured on the rod 87 corresponding to the rod 77. Another hand lever 88 is splined on said rod 87 and has bearing in bearing block 89 secured to the turret carriage.

By the foregoing clutch mechanism the rod 23 which moves the turret carriage can be, by either lever 88 or 85, quickly thrown into or out of operation or quickly reversed. And by operating either hand lever 179 or 76 the tool post carriage can be rapidly moved along the lathe by throwing the quick traverse screw 24 into or out of operation or reversing it. Thus, when the lower sliding rod 43 is in the position shown in Fig. 5, the tool post carriage is stationary or may be moved or be controlled by the ordinary feed mechanism which, however, is not herein shown.

When either hand lever 76 or 179 is thrown outwardly in a direction away from the machine, the sliding rod 43 in Fig. 5 will be moved to the left which will clutch the gear 40 into engagement with the shaft 36 and thus the tool post carriage will be moved to the right, as shown in Fig. 1. When the other hand lever 76 or 179 is thrown toward the machine, the sliding rod 43 will be moved to the right from the position shown in Fig. 5, which will clutch the gear 41 into engagement with the shaft 36 and release the other gear 40 so that the tool post carriage will be reversed quickly and move toward the left, as shown in Fig. 1. On the contrary, when either hand lever 85 or 88 is moved outwardly from the machine a corresponding change in the clutch mechanism relating to the upper shaft 36 will take place and the turret carriage will be moved to the left, as the upper gear 40 moves in the opposite direction to the lower gear 40 which drives it. A reversal of said levers will cause the carriage to move to the right and a middle position of said levers will stop the turret carriage or leave it to the control of the ordinary feeding mechanism, which, however, is not here shown.

In order to stop each carriage and to lock its corresponding screw 23 or 24 stationary for the ordinary feed, a brake mechanism is provided and that mechanism is controlled by the sliding rod 43, that is, controlled by the same mechanism that controls the clutch. The brake mechanism has been described heretofore and is shown in Figs. 5, 8 and 9, consisting of the stationary friction ring 50 carried on the stationary members 47 and 48 and engaged by the clamping movement toward each other of the friction disks 46 and 54 by reason of the springs 52 and rods 53. The inner friction disk 46 is splined on the shaft 36 so as to turn therewith, and as has been stated, the outer friction disk 52 is carried by the pins 53 in connection with the other disk 46. Normally the brake is acting by reason of springs 52, that is when the quick traverse is not being used. At that time the ends of the clutch releasing levers 90 rest in notches 91 on the sliding rods 43 and therefore have no effect. These levers 90 are fulcrumed at 92 in connection with the outer friction disk 54 and one end of said lever 90 carries a hardened pin 94 that engages a corresponding hardened pin 95. Therefore, when the sliding rod 43 is moved in either direction for quick traverse of the carriages, it will press the ends of said levers 90 apart, thereby actuating said levers and causing them to press the two friction disks 46 and 52 so as to disengage the stationary friction ring 50. Then when the quick traverse movement ends and the sliding rods 43 move to the normal positions, as in Fig. 8, the brake will again be in operation and the movement of the carriages be stopped.

What I claim as my invention and desire to secure by Letters Patent is:

1. Gearing including driving means, a shaft, clutch mechanism mounted in connection with said shaft and through which power is transmitted from said driving means to said shaft, said clutch mechanism having as a part thereof a longitudinally movable clutch operating rod, and a brake mechanism acting on said shaft adapted to be actuated by said clutch operating rod.

2. Gearing including driving means, a shaft, clutch mechanism mounted in connection with said shaft and through which power is transmitted from said driving means to said shaft said clutch mechanism having as a part thereof a longitudinally movable clutch operating rod with a notch therein, a brake mechanism adapted to act on said shaft, a lever with one end in said notch when the clutch mechanism is disengaged which is adapted to release said brake mechanism when said clutch rod is moved so as to move the lever out of the notch.

3. Gearing including driving means, a shaft, clutch mechanism mounted in connection with said shaft through which power is transmitted from said driving means to said shaft said clutch mechanism having as a part thereof a longitudinally movable clutch operating rod with a notch therein, a friction brake member secured on said shaft, a slidable friction brake member coöperating with said brake member on the shaft, a lever fulcrumed near said slidable brake member with one end adapted to enter said notch in said rod and be actuated by the longitudinal movement of said rod and the other end of said lever being in position to engage said slidable brake wheel and move it into braking position when said lever is actuated.

In witness whereof, I have hereunto affixed my signature in the presence of the witnesses herein named.

CHARLES L. LIBBY.

Witnesses:
  OLIVE BREEDEN,
  V. H. LOCKWOOD.